United States Patent
Hunt et al.

(10) Patent No.: US 11,118,952 B2
(45) Date of Patent: Sep. 14, 2021

(54) REDUCING MASS AIRFLOW SENSOR CONTAMINATION

(71) Applicant: Hitachi Automotive Systems Americas, Inc., Harrodsburg, KY (US)

(72) Inventors: Frank Warren Hunt, West Bloomfield, MI (US); Anthony P. Boone, Westland, MI (US); Prashanth Avireddi, Farmington Hills, MI (US); Nicholas Ryan Dal Pra, Farmington, MI (US); Zachariah Rabatah, Farmington Hills, MI (US)

(73) Assignee: HITACHI ASTEMO AMERICAS, INC., Harrodsburg, KY (US)

( * ) Notice: Subject to any disclaimer, the term of this patent is extended or adjusted under 35 U.S.C. 154(b) by 131 days.

(21) Appl. No.: 16/519,050

(22) Filed: Jul. 23, 2019

(65) Prior Publication Data

US 2021/0025745 A1    Jan. 28, 2021

(51) Int. Cl.
   *G01F 1/698* (2006.01)
   *F02D 41/18* (2006.01)

(52) U.S. Cl.
   CPC ........... *G01F 1/698* (2013.01); *F02D 41/187* (2013.01)

(58) Field of Classification Search
   CPC .............................. G01F 1/698; F02D 41/187
   See application file for complete search history.

(56) References Cited

U.S. PATENT DOCUMENTS

| 4,735,086 A | * | 4/1988 | Follmer | G01F 1/684 73/204.19 |
| 6,763,298 B2 | | 7/2004 | Boggs et al. | |
| 7,281,531 B1 | * | 10/2007 | Fulton | F02M 35/10255 123/568.17 |
| 7,487,034 B2 | | 2/2009 | Brueckner et al. | |
| 9,945,310 B1 | * | 4/2018 | McQuillen | F02M 25/0227 |
| 2006/0048568 A1 | * | 3/2006 | Korniyenko | G01F 1/698 73/204.22 |
| 2015/0292428 A1 | * | 10/2015 | Hakeem | F01M 13/00 701/104 |
| 2018/0202383 A1 | * | 7/2018 | Alrefaai | F02D 41/1402 |
| 2019/0145333 A1 | * | 5/2019 | Surnilla | F02D 41/1446 123/697 |

* cited by examiner

*Primary Examiner* — Francis C Gray
(74) *Attorney, Agent, or Firm* — Mattingly & Malur, PC (57) ABSTRACT

In some examples, a system includes an airflow sensor disposed at least partially within an air intake system for an engine. The airflow sensor may be configured to measure a flow rate of air flowing past the airflow sensor in the air intake system, and includes a sensor element and a heater associated with the sensor element. A heater control circuit may control the heater to control a temperature of the sensor element. Further, a processor may be configured by executable instructions to cause the heater control circuit to, in a first operation mode, maintain the sensor element at a higher temperature range, and, in a second operation mode, maintain the sensor element at a lower temperature range that is above an ambient temperature and that is lower than the higher temperature range.

18 Claims, 6 Drawing Sheets

REDUCING MASS AIRFLOW SENSOR CONTAMINATION

BACKGROUND

Mass airflow information regarding the mass of air received through a vehicle induction system may be used by an engine controller, such as an engine control unit (ECU) or the like, to balance and deliver the correct fuel mass to the engine cylinders for ensuring efficient engine operation. In internal combustion engine applications, air density varies with the ambient temperature, altitude, and the use of forced induction. Accordingly, mass airflow sensors are more useful than volumetric flow sensors for determining the quantity of intake air provided to the cylinders of an internal combustion engine.

Recently, it has become popular to turn off briefly an internal combustion engine when a vehicle is not moving, such as when the vehicle is stopped at a traffic light, when the vehicle is stopped in a traffic jam, and so forth (referred to herein as "stop-start operation"). The vehicle then restarts the engine automatically, such as when the driver releases the brake pedal or presses on the accelerator pedal. However, during such stop-start operation, gases and other substances from the engine, such as vaporized oil, may back up into the induction system and contaminate the mass airflow sensor. For instance, some types of mass airflow sensors may not have sufficient thermal energy to burn off engine oil vapor or other contaminants that may impinge on the mass airflow sensor from a stopped engine. This contamination may cause these mass airflow sensors to malfunction or otherwise not operate as desired.

SUMMARY

Some implementations include arrangements and techniques for controlling the temperature of a sensor element, such as for reducing the likelihood of contamination. In some examples, a system includes an airflow sensor disposed at least partially within an air intake system for an engine. The airflow sensor may be configured to measure a flow rate of air flowing past the airflow sensor in the air intake system, and includes a sensor element and a heater associated with the sensor element. A heater control circuit may control the heater to control a temperature of the sensor element. Further, a processor may be configured by executable instructions to cause the heater control circuit to, in a first operation mode, maintain the sensor element at a higher temperature range, and, in a second operation mode, maintain the sensor element at a lower temperature range that is above an ambient temperature and that is lower than the higher temperature range.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

The technology herein includes novel arrangements and techniques for minimizing contamination of a mass airflow sensor in a vehicle engine air intake system, such as when the engine is stopped temporarily. For instance, the mass airflow sensor may include a heater, and the heater temperature may be reduced to be maintained within a threshold range above an ambient temperature when the sensor is not in active use (e.g., such as when the engine is turned off or otherwise stopped during operation of the vehicle in stop-start mode or in various other situations). For example, reducing the internal temperature of the mass airflow sensor using the techniques described herein may achieve an improvement in reducing contamination of the sensor without turning off the sensor and without turning off the internal heater within the sensor.

There are a number of advantages of maintaining power (e.g., current flow) to the sensor and/or the sensor internal heater during stop-start operation. For instance, lowering the temperature of the sensor and/or the sensor heater can increase the resistance of the sensor to contamination by oil vapor. Furthermore, maintaining the sensor at a lower temperature that is still above the ambient temperature reduces the sensor warm-up time on engine restart. The benefit of reducing the sensor warm-up time allows quicker use of the sensor signal for engine control upon restart. Furthermore, the sensor lifetime may be increased by reducing the number of sensor element on/off cycles. For instance, reducing the number of power on/off cycles that the sensor endures over the lifetime of the sensor can extend the sensor durability and robustness against failure.

Additionally, maintaining the sensor at a low-level temperature that is above the ambient temperature during stop-start operation can reduce condensation of water vapor on the sensor membrane or other sensor elements. Condensation of water vapor and other contaminants can reduce mass airflow sensor accuracy and response time. In some cases, the mass airflow sensor may also include a humidity sensor mounted internally to the sensor. Excessive condensation on the sensor may cause sensor output shift or other accuracy problems, which may adversely affect engine operation.

Implementations herein may include a sensor heater control circuit located external to the sensor body in some cases, or located inside the sensor body in other cases. The sensor heater control circuit may receive a heater control signal from a controller, such as an ECU or other processor. For example, the control signal may control a variable resistor or other power control device that controls the power (e.g., current and/or voltage level) supplied to the heater located inside the sensor body. The heater may thus be controlled to reduce the temperature of the heater when the engine is stopped during stop-start operation, and then resume the normal sensor operating temperature during normal engine operation, such as for driving the vehicle.

As one non-limiting example, the temperature set point of the sensor heater during normal engine operation may be controlled to be about 100 to 200 degrees C. above the ambient temperature. For example, normal engine operation may include operation of the engine with one or more engine cylinders/pistons pulling air through the induction system. On the other hand, when the engine is temporarily stopped, the temperature set point of the sensor heater may be controlled to be about 1 to 20 degrees C. above the ambient temperature. For instance, empirical testing data has indicated that setting the temperature during engine stoppage to around 10 degrees C. above ambient can be sufficient to prevent or reduce sensor contamination during stop-start operation of the engine.

In addition, due to the sensor heater merely being lowered in temperature, rather than turned off entirely, when the engine is re-started, the mass airflow sensor is able to reach operating temperature more quickly to enable fast recovery time of the sensor to normal operating temperature. As an example, if sensor warm-up time is approximately 100 ms, this time can be reduced by operating the sensor heater at a lower temperature during stop-start mode, rather than turning the sensor heater off altogether. Additionally, in other examples, the sensor heater temperature may be maintained at a fixed absolute value of e.g., 30 degrees C. when the engine is stopped (rather than a value based on ambient temperature) so that sensor heater temperature during stop-start mode is fixed to maintain reduced oil contamination and, in addition, minimize water condensation during cold environmental conditions.

The temperature of the ambient environment may be determined in various fashions, such as using an intake air temperature sensor, which may be integrated into the mass airflow sensor in some cases, or which may be a separate sensor in other cases. In addition, local humidity may be measured by a humidity sensor on the mass airflow sensor or by a separate humidity sensor. In still other alternatives, an electronic control unit or other computing device may determine the ambient temperature and/or intake air humidity from any of other sensor inputs, as is known in the art.

For discussion purposes, some example implementations are described in the environment of controlling a mass airflow sensor in an air induction system for an internal combustion engine. However, implementations herein are not limited to the particular examples provided, and may be extended to other service environments or for other applications, as will be apparent to those of skill in the art in light of the disclosure herein.

Figure 1:
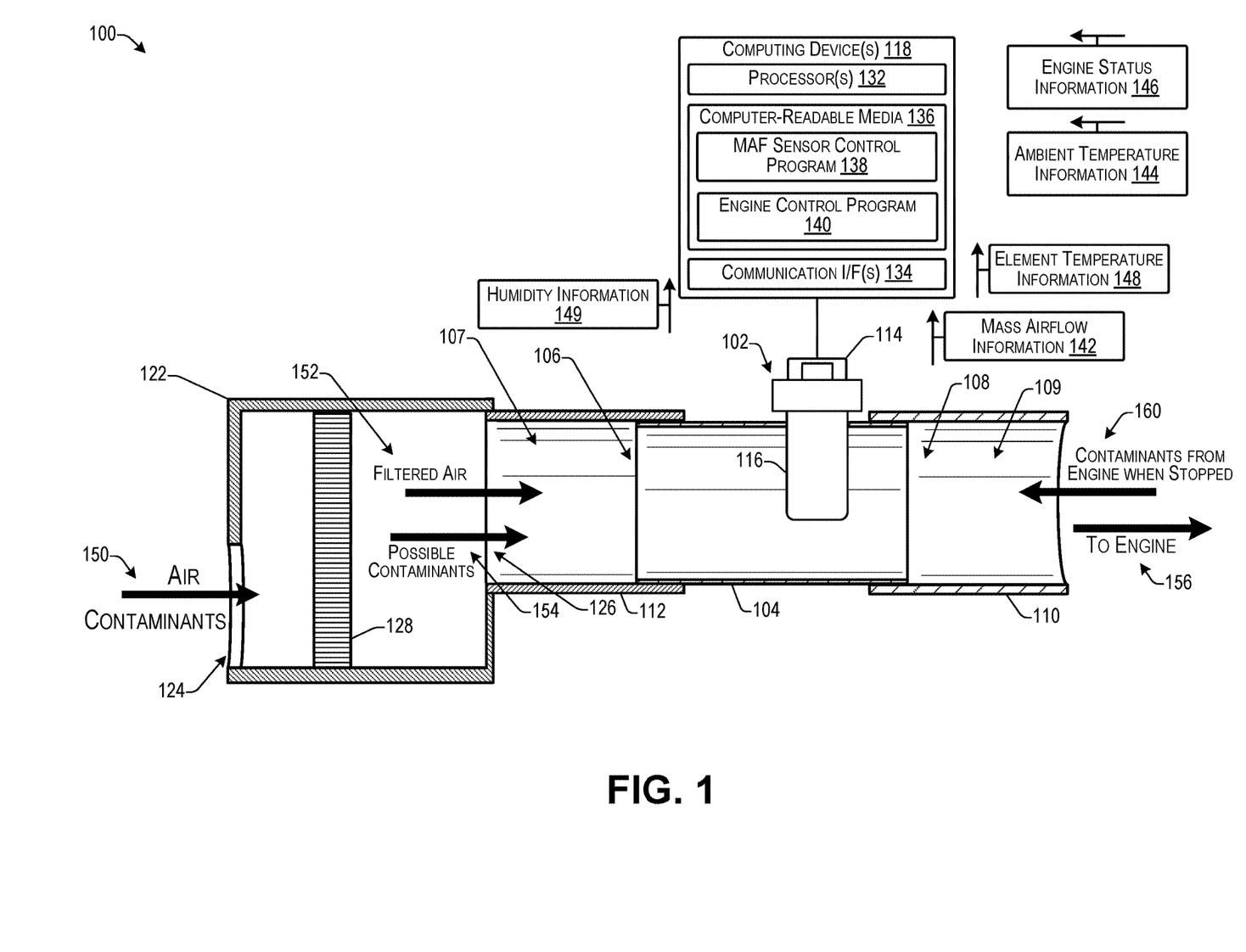
FIG. 1 illustrates a cross sectional view of an example air induction system with a mass airflow sensor according to some implementations.

FIG. 1 illustrates a cross sectional view of an example air induction system 100 with a mass airflow sensor 102 according to some implementations. The mass airflow sensor 102 is located in a tube 104, which may be cylindrical or any other desired shape in cross section. The tube 104 includes an inlet end 106 on an upstream side 107, and an outlet end 108 on a downstream side 109. Further, in other examples, a tubular outlet duct 110 or a tubular inlet duct 112 of the air induction system 100 may serve as part or all of the tube 104.

In some examples, the mass airflow sensor 102 may be a silicon-based mass airflow sensor although implementations herein are not limited to any particular type of mass airflow sensor 102. For example, the mass airflow sensor 102 may include a connector portion 114 and a sensor housing 116 that extends into an airflow passage within the tube 104. In some cases, an integrated electronic circuit (not shown in FIG. 1) may be included in the mass airflow sensor 102, and may serve as a sensor controller for converting a measurement from a sensor element to a calibrated signal that is sent to an electronic control unit (ECU) or other type of computing device(s) 118 connected to the sensor 102 to indicate the current airflow mass. For example, the computing device(s) 118 may control the amount of fuel injected into the engine based on the airflow mass to maintain an optimal air/fuel ratio.

In the system of FIG. 1, the tube 104 including the mass airflow sensor apparatus 102 is connected to the tubular inlet duct 112 and the tubular outlet duct 110. The inlet duct 112 is connected to the inlet end 106 of the tube 104. The inlet duct 112 receives air from a filter enclosure 122 that includes an air inlet 124, an air outlet 126, and a filter 128 located between the air inlet 124 and the air outlet 126. As is known in the art, the filter 128 may filter the air being drawn into the engine through the air induction system 100. The tube 104, outlet duct 110, inlet duct 112, and filter enclosure 122 may be made out of metal, polymer, ceramic, composite, other suitable material, or combinations thereof. Further, implementations herein are not limited to any particular configuration for the intake system 100.

The computing device(s) 118 may include at least one processor 132 and one or more computer readable media 136. In addition, the computing device(s) 118 may be in communication with one or more communication interfaces 134. The processor 132 may be implemented as one or more microprocessors, microcomputers, microcontrollers, digital signal processors, central processing units, state machines, logic circuitries, and/or any devices that manipulate signals based on operational instructions. In some cases, the processor 132 may be one or more hardware processors and/or logic circuits of any suitable type specifically programmed or configured to execute the algorithms and processes described herein. The processor 132 may be configured to fetch and execute computer-readable, processor-executable instructions stored in the computer-readable media 136. As one non-limiting example, the computing device(s) may include one or more vehicle ECUs that are connected to each other via the communication interface(s) 134, such as through a Controller Area Network (CAN bus) or other connection protocol(s).

The computer-readable media 136 may be an example of tangible non-transitory computer storage media and may include volatile and nonvolatile memory and/or removable and non-removable media implemented in any type of technology for storage of information such as computer-readable processor-executable instructions, data structures, program modules, or other data. The computer-readable media 136 may include, but is not limited to, RAM, ROM, EEPROM, flash memory, solid-state storage, magnetic disk storage, optical storage, and/or other computer-readable media technology. Accordingly, the computer-readable media 136 may be computer storage media able to store programs, which may include instructions, modules, applications, or other executable code, that may be executed by the processor 132. Further, when mentioned, non-transitory computer-readable media exclude media such as energy, carrier signals, electromagnetic waves, and signals per se.

The computer-readable media 136 may be used to store and maintain functional components that are executable by the processor 132. In some implementations, these functional components comprise instructions or programs that are executable by the processor 132 and that, when executed, implement operational logic for performing the actions and services attributed above to the computing device(s) 118. Functional components of the computing device(s) 118 stored in the computer-readable media 136 may include a mass airflow (MAF) sensor control program 138, which may include a series of instructions and/or processor-executable code for causing the processor 132 to perform the functions described herein for controlling the mass airflow sensor 102. In addition, the computer-readable media 136 may include an engine control program 140 that may control the engine, such as based in part on the mass airflow determined from the mass airflow sensor 102, as well as based on a plurality of other inputs and information. As one example, the engine control program 140 may include a plurality of executable programs distributed in the vehicle on a plurality of ECUs or other computing devices 118 for controlling engine operation.

In addition, the computer-readable media 136 may also store data, data structures and the like, that are used by the functional component(s). Data stored by the computer readable media 136, at least temporarily, may include sensed information, such as mass airflow information 142 determined from the mass airflow sensor 102, as well as ambient temperature information 144, and engine status information 146. For example, as mentioned above, the ambient temperature information may be obtained from an air intake temperature sensor (not shown), from a temperature sensor incorporated into the mass airflow sensor 102, or from any of various other sources, as is known in the art. In addition, the received data may include engine status information, which may include whether the engine is in stop-start mode, whether the engine is on or off, current operating condition of the engine, and so forth.

Furthermore, in some examples, element temperature information 148 may be provided to or otherwise received by the MAF sensor control program 138 for accurately determining and adjusting the temperature of the sensor element. In addition, in some examples, humidity information 149 may also be provided to or otherwise received by the MAF sensor control program 138, and may be used, at least in part, for determining a minimum temperature to be applied to the sensor element in some examples. Further, the computing device(s) 118 may include other logical, programmatic, and/or physical components, of which those described are merely examples that are related to the discussion herein.

The communication interface(s) 134 may include one or more interfaces and hardware components for enabling communication with various other computing devices 118, various sensors, and various actuators (not shown in FIG. 1). For instance, the communications interface(s) 134 may enable communication through a wired network (e.g., copper, fiber optic, etc.). For example, the CAN bus protocol is a vehicle bus protocol that allows ECUs and other devices to communicate with each other without a host computer. CAN bus may include at least two different types. For example, high-speed CAN may be used in applications where the bus runs from one end of the environment to the other, while fault-tolerant CAN is often used where groups of nodes are connected together.

In addition, the communication interfaces 134 may enable communication by various other protocols for communicating with sensors, such as SENT (Single Edge Nibble Transmission-SAE J2716) protocol, which is a popular protocol for sensors in the vehicle industry, although implementations herein are not limited to the SENT protocol. For instance, the SENT protocol includes a point-to-point scheme for transmitting a signal to a controller. The SENT protocol may be used to allow for transmission of high resolution data with a low system cost. Further, in some cases, the communication interfaces may enable other types of communications, such as wireless communications, radio communications, cellular communication, or the like.

As indicated at 150, during engine operation, air that may include contaminants may enter the filter enclosure 122 and pass through the filter 128. As indicated at 152, filtered air may enter the intake duct 112 during engine operation. Additionally, in some cases, as indicated at 154, possible contaminants may also be present on the intake side such as dust, chemicals from filter media, duct lubricant, sulfur, water, or the like, but these do not generally pose a contaminant issue during engine operation to the relatively large quantity of airflow. The filtered air may flow past the mass airflow sensor 102, which may sense the air mass flow, and to the engine as indicated at 156.

On the other hand, when the engine is stopped, then as indicated at 160, contaminants from the engine may flow back into the intake system 100 and may contaminate the mass airflow filter 102. Examples of contaminants that may flow from the engine when stopped include oil vapor, soot, vaporized fuel, and so forth. Additionally, the possible contaminants 154 on the upstream side, if present, may also contaminate the mass airflow filter 102 when the engine is stopped.

As one example, the mass airflow sensor 102 may be a silicon-base mass airflow sensor or other membrane-based mass airflow sensor, and may not have sufficient thermal mass to burn off oil contamination. When the engine is turned off, air with vaporized fuel and oil may travel back up the induction system 100 from the engine to the mass airflow sensor 102. If the mass airflow sensor element is hot, these substances may contaminate the sensor element of the mass airflow sensor 102. For example, oil may change the heat transfer coefficient of the sensor element by attaching to the element. Furthermore, oil attached to the element may enable other types of particles to adhere to the element, which may further adversely affect the properties of the sensor element.

The inventors herein have determined that a membrane-based mass airflow sensor at lower temperature than the typical operating temperature may not become contaminated as easily as at the operating temperature. Accordingly, in the examples herein, the power to a sensor heater (not shown in FIG. 1) may be reduced by the MAF sensor control program 138 to lower the temperature of the sensor heater, thereby lowering the temperature at the sensor element to minimize contamination of the mass airflow sensor. In some cases, the temperature may be lowered to be within a specified range above an ambient temperature within the intake system 100. In other cases, the temperature of the sensor element may be lowered to a specified temperature regardless of the ambient air temperature. In either case, the contamination of the sensor element may be reduced, as discussed additionally below.

Figure 2:
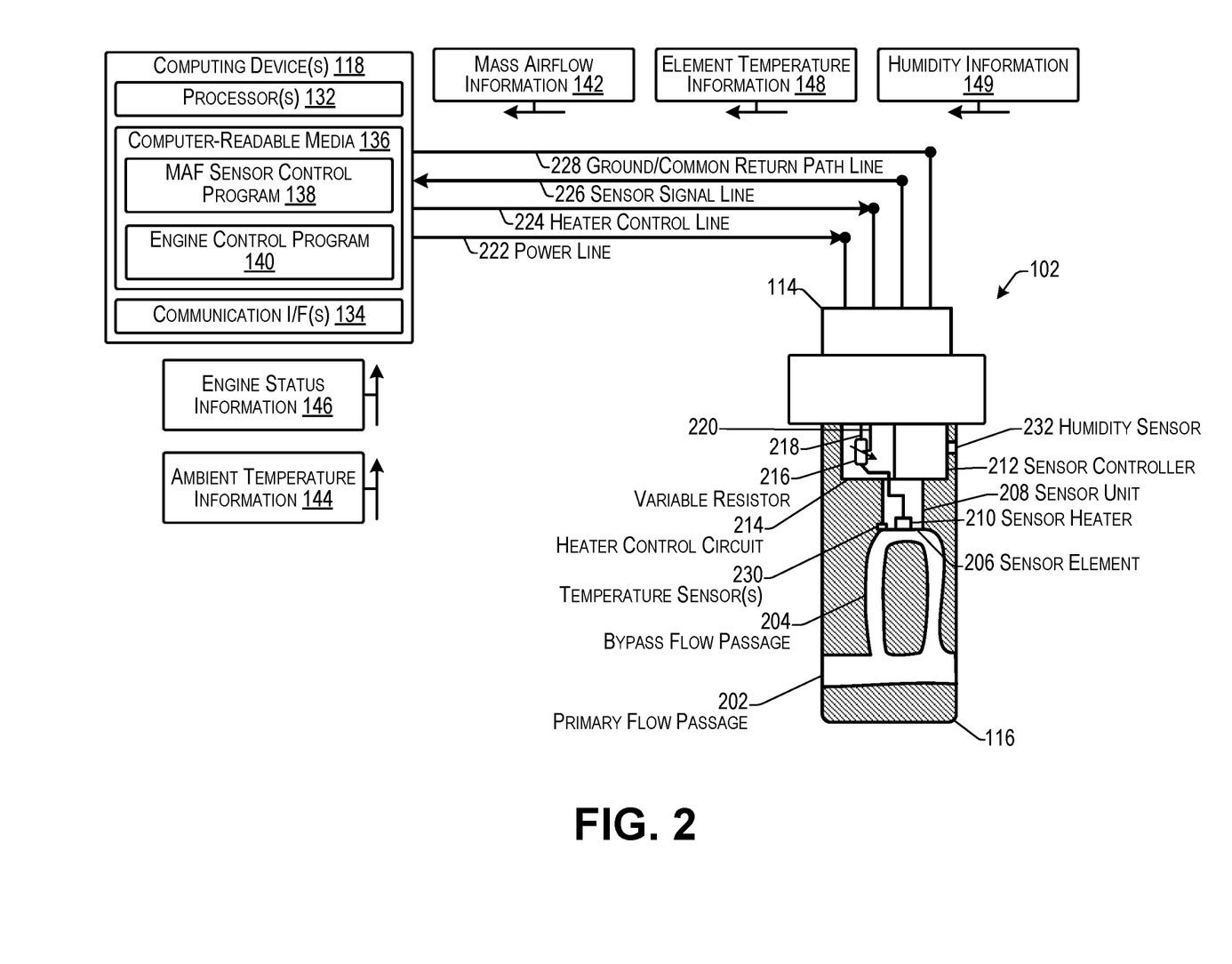
FIG. 2 illustrates a cross-sectional view of an example mass airflow sensor according to some implementations.

FIG. 2 illustrates a cross-sectional view of an example mass airflow sensor 102 according to some implementations. In this example, the mass airflow sensor 102 includes a primary flow passage 202 and a bypass flow passage 204. A sensor membrane 206 is located at the top of the bypass flow passage 204. For instance, the sensor membrane 206 may be a silicon membrane or other suitable type of sensor membrane, and may be associated with a sensor unit 208 and a sensor heater 210. When the engine is stopped, contaminants may traverse the bypass flow passage 204 and may adhere to the sensor membrane 206, such as when the sensor membrane remains heated to an operating temperature by the sensor heater 210.

The sensor heater 210 may be controlled for heating the sensor membrane 206 to a desired temperature for performing sensing of mass airflow. In addition, a sensor controller 212 may receive information from the sensor membrane 206 via the sensor unit 208, and may send corresponding mass airflow information 142 to the computing device 118. In some examples, the sensor controller 212 may be configured to modify the mass airflow information 142 before sending it to the computing devices 118, such as based on calibration information, or the like, that may be accessed by the sensor controller 212. Alternatively, in other examples, the sensor controller 212 may send raw sensor data as the mass airflow information 142.

In this example, the mass airflow sensor 102 includes a heater control circuit 214 within the sensor body 116 of the mass airflow sensor 102. As one non-limiting example of a control circuit, the heater control circuit 214 may include a variable resistor 216. For example, a power line 218 may pass electric power through the variable resistor to the sensor heater 210. A control line 220 may enable control of the variable resistor 216 to control the amount of power supplied to the sensor heater 210. Accordingly, the heater control circuit 214 may be controlled for controlling the amount of power supplied to the sensor heater 210, and thereby controlling the amount of heat generated by the sensor heater 210. Furthermore, while one example of a heater control circuit 214 is illustrated and described herein, numerous variations will be apparent to those of skill in the art having the benefit of the disclosure herein.

In this example, the connector portion 114 of the mass airflow sensor 102 includes four connections. Although, more or fewer connections may be included in other examples. Thus, a power line 222 may supply power for operation of the mass airflow sensor heater, the sensor controller 212, and the sensor unit 208. A heater control line 224 may provide a control signal from the computing device 118 to the signal line 220 for controlling the heater control circuit 214 for controlling the heater temperature. A sensor signal line 226 may be used to pass the mass airflow information 142 from the mass airflow sensor 102 to the computing device 118. In addition a ground and/or common return path line 228 may serve as a return path to a ground plane or the like (not shown in FIG. 2).

In the example of FIG. 2, power for the sensor heater 210 is provided by the power line 222 and the control signal for controlling the heater temperature is supplied via the heater control line. One or more temperature sensors 230 may be positioned proximate to the sensor element 206, such as for providing the sensor element temperature information 146. The temperature sensor(s) 230 may be used for accurately determining the temperature of the sensor element 206, and for adjusting the heater temperature accordingly. Alternatively, the level of power supplied to the sensor heater 210 may be used for determining the approximate temperature of the sensor element 206, such as based on empirical and/or calibration data previously determined for the sensor heater 210 and the sensor element 206.

Thus, the MAF sensor control program 138 may receive engine status information 146, and in some cases, ambient temperature information 144, sensor element temperature information 148 and/or humidity information 149, and may send a control signal to the heater control circuit 214 for controlling the temperature of the sensor element 206. As one example, suppose that the processor 132 of the computing device 118 receives engine status information 146 that indicates that the engine is running, e.g., at least one cylinder is receiving air and fuel for driving a piston based on internal combustion, or the like. Based at least on the engine status information 146, the MAF sensor control program 138 may send a first control signal to the heater control circuit 214 to cause the heater control circuit 213 to provide a higher amount of power to the sensor heater 210 in a first operation mode to maintain the sensor element 206 at a first temperature range above an ambient temperature.

Subsequently, suppose that the processor 132 receives additional engine status information 146 that indicates that the engine has stopped, and further indicating that the engine is operating in a stop-start mode and might be expected to restart again soon. For instance, based on the ignition being on and/or the vehicle transmission still being in drive, or the like, the processor may determine that the vehicle is in stop-start mode and the engine is likely to restart again shortly. Based at least on the updated engine status information and based on determining that the vehicle is in stop-start mode, the processor may sending a second control signal to the heater control circuit to cause the heater control circuit to provide a lower amount of power to the sensor heater in a second operation mode to maintain the sensor element at a second temperature range that is lower than the first temperature range.

In some examples, the second temperature range may be fixed, e.g., a specified constant temperature, such as approximately 40 degrees C., plus or minus 5 degrees. For instance, the specified constant temperature may be set sufficiently high to help ensure that water does not condense in the mass airflow sensor 102. Alternatively, in other examples, the second temperature range may be based at least partially on a current ambient temperature, such as may be determined from ambient temperature information 144. As one example, the second temperature range may be 1-20 degrees above ambient temperature. Thus, when the engine is off, a lower amount of power may be supplied to the heater to maintain the sensor element at a lower temperature, and thereby reduce the likelihood of contamination of the sensor element while the engine is stopped, and without completely turning off the mass airflow sensor 102.

Furthermore, in some examples, the humidity of the intake air may also be taken into consideration when determining the second temperature range. For example, the temperature range may be set sufficiently high to ensure that water does not condense within the mass airflow sensor 102. Accordingly, a humidity sensor 232 may be integrated with the mass airflow sensor 102 for providing the humidity information 149. Alternatively, a separate humidity sensor may be included in the air intake system, or may be included external to the air intake system.

The described arrangements and techniques may be used for vehicle engines that are configured to operate in stop-start mode, such as to reduce emissions or improve fuel economy, as well as other situations in which the engine is turned off briefly, but might be restarted. The techniques described herein may improve contamination resistance of the mass airflow sensor by reducing the heater temperature during oil outgassing conditions that may occur in the sensor environment when the engine shuts off and air with contaminants is released via crankcase-ventilation, or the like. During stop-start mode, engine oil outgassed from the engine may travel through the air induction system (AIS) and out of the engine. On the way out of the AIS, some of the oil may end up deposited on the hot mass airflow sensor surface causing contamination and degradation of the mass airflow sensor signal and sensor accuracy.

Membrane-type mass airflow sensors may be sensitive to outgassing because they typically include one heating resistor (e.g., the sensor element 206) surrounded by multiple temperature measuring resistors (not shown in FIG. 2 for clarity of illustration). As mentioned above, reducing the temperature of the sensor element by lowering the heat generated by the heater reduces the amount of oil deposited on the surface of the sensor element membrane. If an oil film forms on the surface of the sensor element 206 facing the bypass flow passage 204, this may affect the conductivity of the sensor element 206, which may cause an error in the amount of measured mass airflow. Such errors may lead to increased emissions, poor fuel economy, and/or reduced vehicle drivability. Further, in some examples, as mentioned above, the mass airflow sensor 102 may include the integrated humidity sensor 232, which may also be used to determine the minimum temperature during the lower power phase to help avoid water condensation inside the mass airflow sensor 102. Furthermore, while a silicon-membrane-based sensor is described in some examples herein, implementations herein are not limited to silicon membranes, and any of various other membrane or film-type sensors with heated element technology may be employed in the examples herein.

Figure 3:
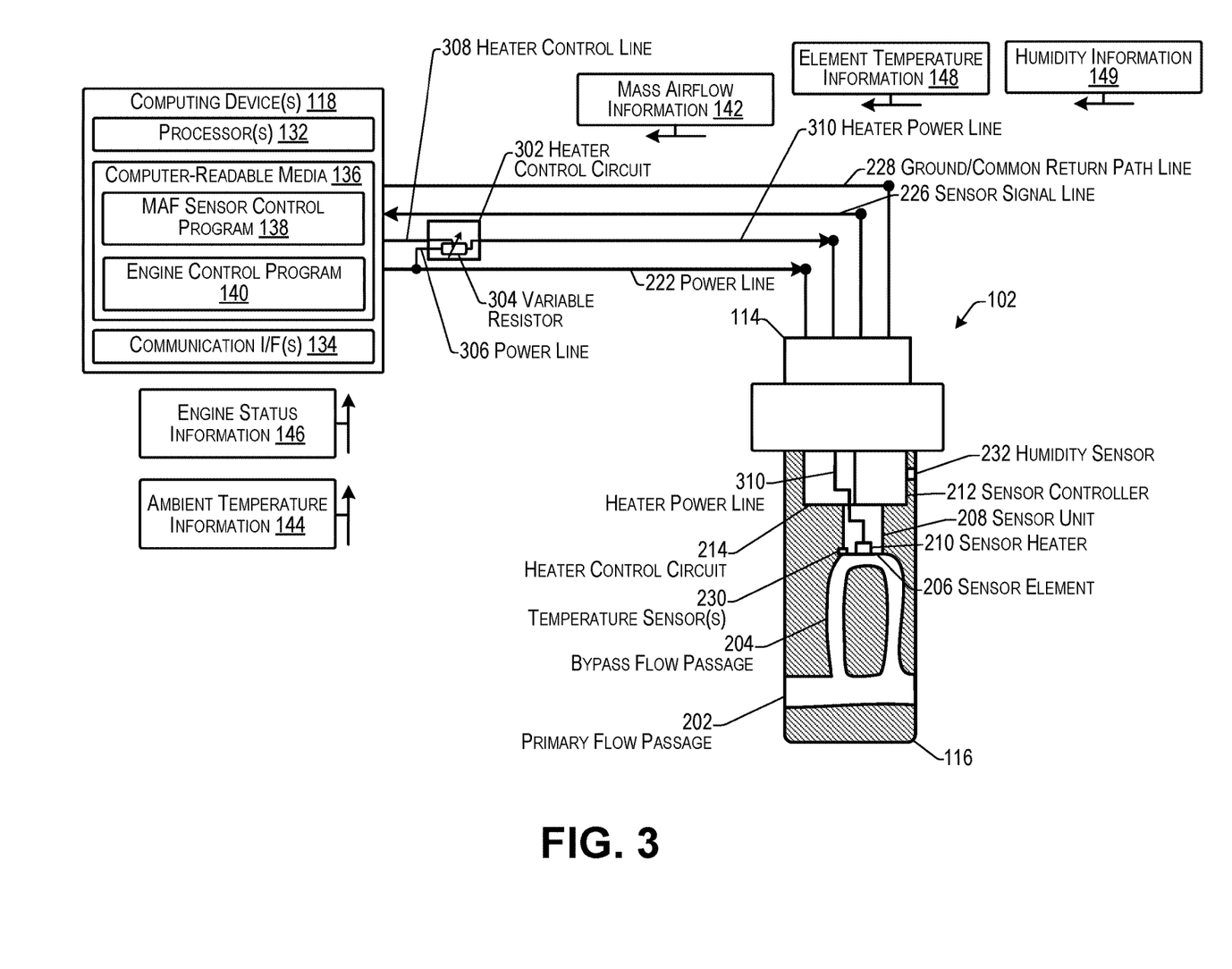
FIG. 3 illustrates a cross-sectional view of an example mass airflow sensor according to some implementations.

FIG. 3 illustrates a cross-sectional view of an example mass airflow sensor 102 according to some implementations. In this example, a heater control circuit 302 is located external to the mass airflow sensor 102, such as between the mass airflow sensor 102 and the computing device(s) 118. The heater control circuit 302 includes a variable resistor 304 in this example, but other techniques for controlling the temperature of the sensor heater 206 may be employed in other examples, as will be apparent to those of skill in the art having the benefit of the disclosure herein.

In the example of FIG. 3, a power line 306 passes power to the heater control circuit 302 for providing power to the sensor heater 210, while the power line 222 provides power to the sensor controller 212 and the sensor unit 208. In addition, a heater control line 308 controls the variable resistor 304 in the heater control circuit 302 for controlling the amount of power that is passed along a heater power line 310 to the heater 210. Accordingly, similar to the operation of the heater control circuit discussed above with respect to FIG. 2, the MAF sensor control program 138 may send a control signal to the heater control circuit 302 for controlling the amount of power provided to the sensor heater 210 for controlling the temperature of the sensor heater 210 and thereby controlling the temperature of the sensor element 206. Thus, the MAF sensor control program 138 may control the temperature of the sensor element 206 based on information such as engine status information 146, ambient temperature information 144, element temperature information 148, and, in some examples, humidity information 149.

The example of FIG. 3 may operate similarly to the example of FIG. 2 discussed above. For instance, the MAF sensor control program 138 may receive engine status information 146, and may determine whether the engine is on or off, and further may determine whether the vehicle is in a stop-start mode and likely to restart again in the near future. In such a case, when the MAF sensor control program 138 determines that the engine is stopped, the MAF sensor control program 138 may send a control signal on the heater control line 308 to the heater control circuit 302 for controlling the amount of power provided to the sensor heater 210 to reduce the heat generated by the sensor heater 210 and thereby decrease the temperature of the sensor element 206 to a desired lower temperature range.

Subsequently, when the MAF sensor control program 138 determines that the engine has restarted or is about to restart, the MAF sensor control program 138 may send a single to the heater control circuit 302 to heat the sensor heater 210 to the higher temperature range for operating the mass airflow sensor 102 while the engine is on and running.

Figure 4:
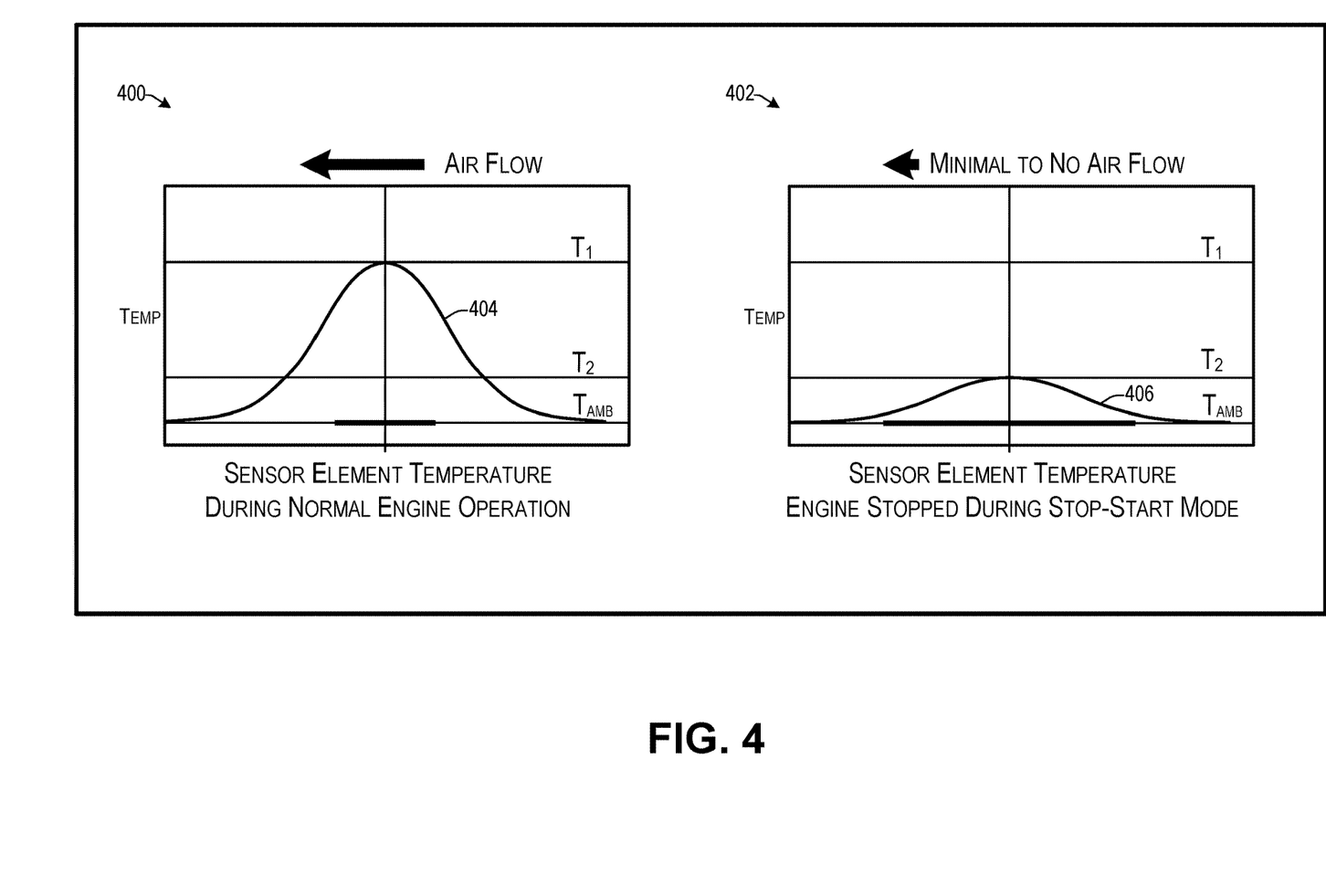
FIG. 4 illustrates example graphs showing a target temperature for normal engine operation and a target temperature during engine stoppage, respectively, according to some implementations.

FIG. 4 illustrates example graphs 400 and 402 showing a target temperature for normal engine operation and a target temperature during engine stoppage, respectively, according to some implementations. For example, graph 400 illustrates a temperature curve 404 with respect to airflow, indicating the sensor element temperature during normal engine operation. For example, the target temperature may be $T_1$, which may be in a range between 150 and 200 degrees C. above the ambient temperature $T_{AMB}$. For example, the temperature $T_1$ may be set to a specified temperature regardless of the ambient temperature such that the temperature is always much higher than the ambient temperature $T_{AMB}$.

Graph 402 illustrates a temperature curve 406 with respect to airflow, indicating the sensor element target temperature when the engine is stopped during stop start mode such that there is minimal to no airflow through the mass airflow sensor. For example, the target temperature may be $T_2$, which may be in a range between 1-20 degrees C. above the ambient temperature $T_{AMB}$. In some cases, the temperature $T_2$ may vary based on the ambient temperature while in other cases, the temperature $T_2$ may be a pre-specified temperature that is sufficiently high to ensure that $T_2$ is likely to be always above the ambient temperature $T_{AMB}$.

As one example, suppose that the ambient temperature is −10 degree C., the sensor heater may be configured to maintain the sensor element at a certain temperature above ambient temperature $T_{AMB}$, e.g., between 1-20 degrees C. above $T_{AMB}$. Accordingly, the MAF sensor control program may set a delta with respect to ambient to control the lower temperature $T_2$ of the sensor element by controlling the power to the sensor heater. The MAF sensor control program may maintains the temperature at a determined level above ambient $T_{AMB}$ for optimal sensor operation and restart. Furthermore, in some examples, the MAF sensor control program may consider the humidity when specifying the lower temperature $T_2$ to protect against condensation forming in the mass airflow sensor. Accordingly, in some examples herein, $T_1$ might be 150-200 degrees C. above ambient $T_{AMB}$, while $T_2$ might be only 5-10 degrees C. above ambient $T_{AMB}$. Further, in other example, $T_2$ may be between 0.5-20 degrees C. above ambient $T_{AMB}$, and $T_1$ may be more than 100 degrees C. above $T_{AMB}$.

Furthermore, in other examples, the ambient temperature may merely be a reference point to show that both $T_1$ and $T_2$ are maintained above the ambient temperature at all times, but are not necessarily set dependent on the ambient temperature. For example, $T_1$ and $T_2$ may be pre-specified temperatures, such as between 120-250 degrees C. for $T_1$ and 35-55 degrees C. for $T_2$, which may be maintained regardless of the ambient temperature. Thus, in this case, $T_2$ may be sufficiently high that the ambient temperature $T_{AMB}$ is unlikely to exceed $T_2$.

Figure 5:
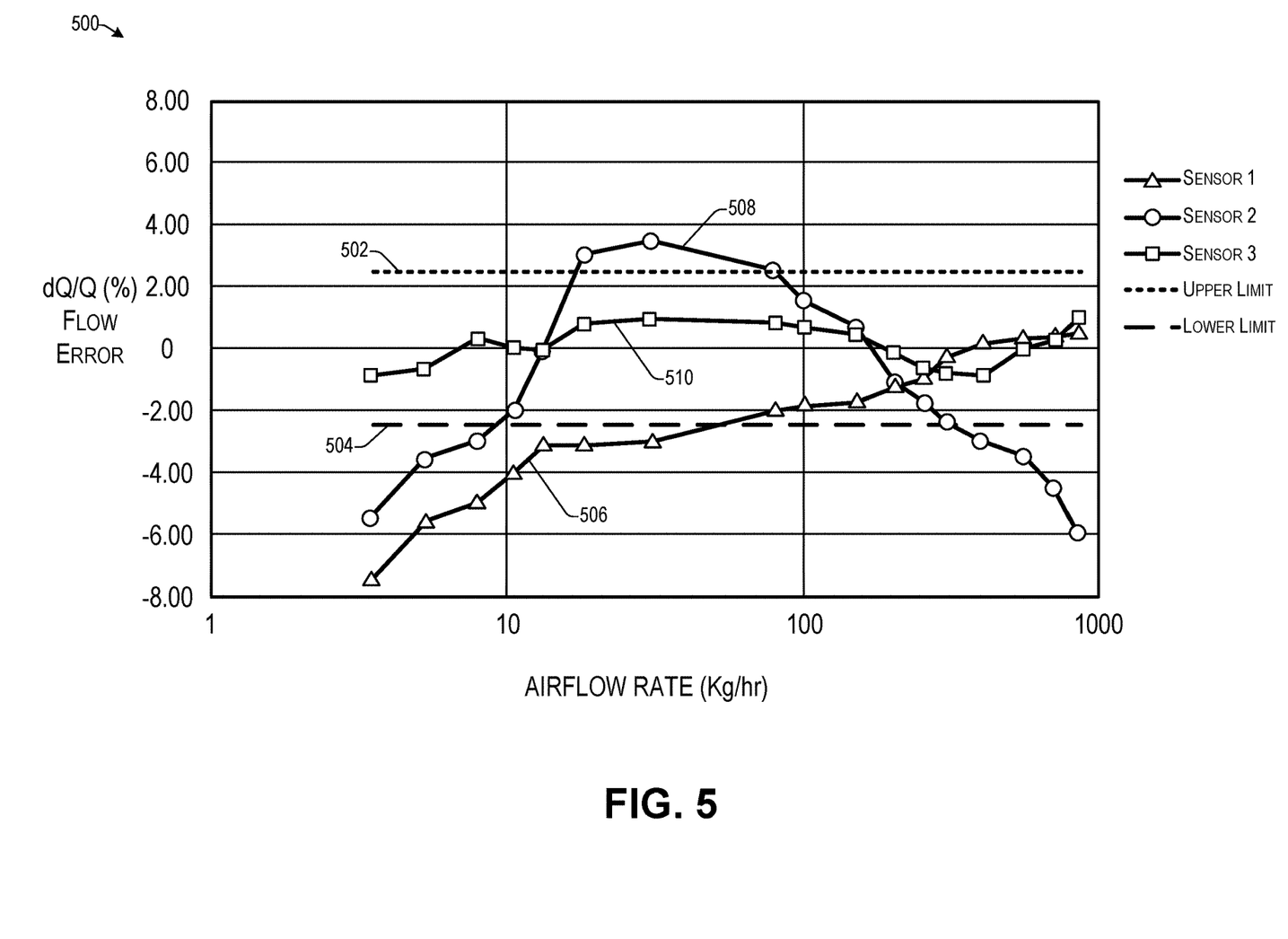
FIG. 5 illustrates an example graph showing dQ/Q as a function of airflow rate according to some implementations.

FIG. 5 illustrates an example graph 500 showing dQ/Q as a function of airflow rate according to some implementations. For example, a standard output measurement for the mass airflow sensor may be dQ/Q, where Q is the mass of air, e.g., in kilograms, and dQ/Q is the change of measured flow at a constant mass flow rate. In this example, the flow error is shown as a function of the airflow rate in Kg/hr.

The example graph 500 of FIG. 5 illustrates example results of the accuracy of mass airflow measurement for sensors that have been operated with and without the heater temperature control described herein. An upper limit 502 indicates an upper range of allowable error while a lower limit to 504 indicates a lower range for allowable error. In this example, as indicated at 506, sensor 1 has been contaminated, and shows errors in measurements on the low side for airflow rates between 1 and about 70 Kg/hr. Further, as indicated at 508, sensor 2 has been contaminated, and shows errors in flow rate measurements on the high side between 10 and 100 Kg/hr, as well as errors on the low side when the airflow is less than 10 KG/hr and greater than 500 KG/hr. Additionally, as indicated at 510, sensor 3, which was operated to avoid contamination shows operation within the allowable upper and lower limits over the measured range.

Figure 6:
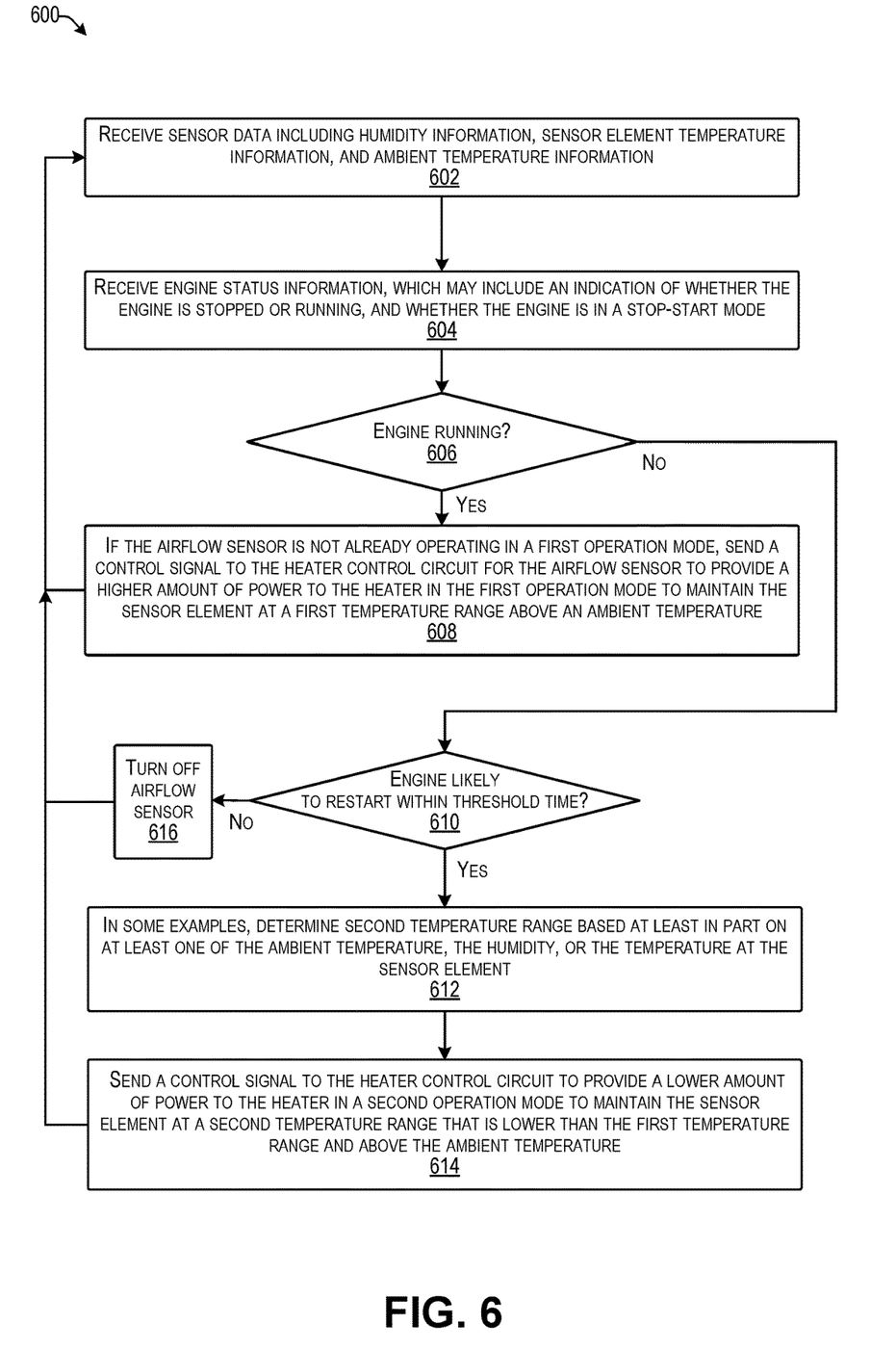
FIG. 6 is a flow diagram illustrating an example process for controlling a mass airflow sensor according to some implementations.

FIG. 6 is a flow diagram illustrating an example process 600 for controlling a mass airflow sensor according to some implementations. The process is illustrated as a collection of blocks in a logical flow diagram, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures, and the like, that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, apparatuses, and systems described in the examples herein, although the processes may be implemented in a wide variety of other environments, apparatuses, and systems.

The example process 600 may be executed by the computing device(s) 118 or other suitable computing device(s). The process 600 sets forth an example algorithm for automatic control of a mass airflow sensor for reducing the likelihood of contamination of the sensor according to some implementations.

At 602, the computing device may receive sensor data including which may include humidity information, sensor element temperature information, and/or ambient temperature information.

At 604, the computing device may receive engine status information, which may include an indication of whether the engine is stopped or running, and whether the engine is in a stop-start mode, or similar mode indicative that the engine will restart within at threshold time, e.g., within several minutes or the like.

At 606, the computing device may determine if the engine status information indicates that the engine is running. If so, the process goes to 608. If not, the process goes to 610.

At 608, if the engine is running, and if the airflow sensor is not already operating in a first operation mode, the computing device may send a control signal to the heater control circuit for the airflow sensor to provide a higher amount of power to the heater in the first operation mode to maintain the sensor element at a first temperature range above an ambient temperature.

At 610, if the engine is not running, the computing device may determine whether the engine is likely to restart within the threshold time. For example, the engine status information may indicate whether the engine is in a stop-start mode, and is therefore likely to restart within the next few seconds to the next minute or two. If so, the process goes to 612. If not, the process goes to 616.

At 612, in some examples, the computing device may determine a second temperature range based at least in part on at least one of the ambient temperature, the humidity, or the temperature at the sensor element.

At 614, the computing device may send a control signal to the heater control circuit to provide a lower amount of power to the heater in a second operation mode to maintain the sensor element at the second temperature range that is lower than the first temperature range and above the ambient temperature.

At 616, if the engine is stopped and not likely to be restarted within the threshold time, the airflow sensor may be turned off.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, processes, and techniques described herein may be considered in the general context of computer-executable instructions, such as programs stored on computer-readable media, and executed by the processor(s) herein. Generally, programs include computer-readable instructions, routines, modules, applications, objects, components, data structures, executable code, etc., for performing particular tasks or implementing particular abstract data types. These programs and the like may be executed as native code or may be downloaded and executed, such as in a virtual machine or other just-in-time compilation execution environment. Typically, the functionality of the programs may be combined or distributed as desired in various implementations. An implementation of these programs and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:

1. A mass airflow sensor apparatus comprising:
   an airflow sensor disposed at least partially within an air intake system for an engine, the airflow sensor configured to measure a flow rate of air flowing past the airflow sensor in the air intake system, the airflow sensor including a sensor element and a heater associated with the sensor element;
   a heater control circuit to control an amount of power provided to the heater; and
   a processor configured by executable instructions to cause the heater control circuit to provide a higher amount of power to the heater in a first operation mode to maintain the sensor element at a first temperature range above an ambient temperature, and to cause the heater control circuit to provide a lower amount of power to the heater in a second operation mode to maintain the sensor element at a second temperature range above the ambient temperature that is lower than the first temperature range, the processor further configured to:
receive humidity information from a humidity sensor indicating a humidity of air in the air intake system; and
determine the second temperature range for the sensor element based at least partially on the humidity information.

2. The mass airflow sensor apparatus as recited in claim 1, wherein the heater control circuit is integrated into the airflow sensor.

3. The mass airflow sensor apparatus as recited in claim 1, wherein the heater control circuit is external to the airflow sensor.

4. The mass airflow sensor apparatus as recited in claim 1, wherein:
the airflow sensor includes a membrane as a sensor element; and
the membrane is heated by the heater for sensing airflow.

5. The mass airflow sensor apparatus as recited in claim 1, wherein:
the first temperature range is more than 100 degrees C. above the ambient temperature; and
the second temperature range is between 1 and 20 degrees C. above the ambient temperature.

6. The mass airflow sensor apparatus as recited in claim 1, wherein the processor is further configured by the executable instructions to:
receive engine status information indicating that the engine is stopped and is likely to restart within a threshold period of time; and
based on receiving the engine status information, send a control signal to the heater control circuit to cause the heater control circuit to provide the lower amount of power to the heater.

7. A method comprising:
receiving, by a processor, engine status information;
based at least on the engine status information, sending a first control signal to a heater control circuit associated with an airflow sensor, the airflow sensor including a sensor element and a heater associated with the sensor element, the first control signal causing the heater control circuit to provide a higher amount of power to the heater in a first operation mode to maintain the sensor element at a first temperature range above an ambient temperature;
receiving, by the processor, updated engine status information; and
based at least on the updated engine status information, sending a second control signal to the heater control circuit, the second control signal causing the heater control circuit to provide a lower amount of power to the heater in a second operation mode to maintain the sensor element at a second temperature range that is lower than the first temperature range and above the ambient temperature.

8. The method as recited in claim 7, further comprising:
receiving, with the updated engine status information, an indication that the engine is stopped and is likely to restart within a threshold period of time; and
based on receiving the engine status information, sending a control signal to the heater control circuit to cause the heater control circuit to provide the lower amount of power to the heater.

9. The method as recited in claim 7, further comprising:
receiving humidity information from a humidity sensor indicating a humidity of air in the air intake system; and
determining the second temperature range for the sensor element based at least partially on the humidity information.

10. The method as recited in claim 7, further comprising:
receiving, from a temperature sensor associated with the sensor element, an indicated of a temperature of the sensor element; and
based on the indicated temperature being outside the first temperature range, sending an additional control signal to the heater control circuit to adjust the temperature of the heater for moving the temperature of the sensor element toward the second temperature range.

11. The method as recited in claim 7, wherein sending the second control signal to the heater control circuit includes sending a signal to control a resistance of a variable resistor included in the heater control circuit.

12. The method as recited in claim 7, wherein:
the airflow sensor includes a membrane as the sensor element; and
maintaining the sensor element at the second temperature range comprises lowering an amount of heat applied by the heater to the membrane.

13. The method as recited in claim 7, wherein:
the first temperature range is more than 100 degrees C. above the ambient temperature; and
the second temperature range is between 1 and 20 degrees C. above the ambient temperature.

14. A system comprising:
an airflow sensor disposed at least partially within an air intake system for an engine, the airflow sensor configured to measure a flow rate of air flowing past the airflow sensor in the air intake system, the airflow sensor including a sensor element and a heater associated with the sensor element;
a heater control circuit controlling the heater to control a temperature of the sensor element; and
a processor configured by executable instructions to cause the heater control circuit to:
in a first operation mode, maintain the sensor element at a higher temperature range; and
in a second operation mode, maintain the sensor element at a lower temperature range that is above an ambient temperature and that is lower than the higher temperature range, the processor further configured to:
receive engine status information indicating that the engine is stopped and is likely to restart within a threshold period of time; and
based on receiving the engine status information, send a control signal to the heater control circuit to cause the heater control circuit to enter the second operation mode to maintain the sensor element at the lower temperature range that is above the ambient temperature and that is lower than the higher temperature range.

15. The system as recited in claim 14, wherein the heater control circuit is integrated into the airflow sensor.

16. The system as recited in claim 14, wherein the heater control circuit is external to the airflow sensor.

17. The air induction system as recited in claim 14, wherein the higher temperature range is more than 100 degrees C. above the ambient temperature, and the lower temperature range is between 1 and 20 degrees C. above the ambient temperature.

18. The air induction system as recited in claim 14, wherein the processor is further configured by the executable instructions to:
   receive humidity information from a humidity sensor indicating a humidity of air in the air intake system; and
   determine the lower temperature range based at least partially on the humidity information.

\* \* \* \* \*